(12) United States Patent
Li et al.

(10) Patent No.: US 6,959,476 B2
(45) Date of Patent: Nov. 1, 2005

(54) ALUMINUM AUTOMOTIVE DRIVE SHAFT

(75) Inventors: Zhong Li, Lexington, KY (US); Paul Platek, Massillon, OH (US)

(73) Assignee: Commonwealth Industries, Inc., Urichsville, OH (US)

( * ) Notice: Subject to any disclaimer, the term of this patent is extended or adjusted under 35 U.S.C. 154(b) by 1 day.

(21) Appl. No.: 10/692,488

(22) Filed: Oct. 27, 2003

(65) Prior Publication Data

US 2005/0086784 A1   Apr. 28, 2005

(51) Int. Cl.$^7$ ............................................. B23P 17/00
(52) U.S. Cl. .................. 29/421.1; 29/430; 29/527.7; 29/897.2; 148/440; 420/534; 420/535; 420/537; 420/538; 420/543
(58) Field of Search ........................ 29/527.5, 527.6, 29/527.7, 521.1, 421.1, 897.2, 33 D, 430; 148/437, 440; 420/532, 533, 534, 535, 537, 420/538, 540, 541, 542, 543

(56) References Cited

U.S. PATENT DOCUMENTS

| | | | | |
|---|---|---|---|---|
| 4,334,935 A | * | 6/1982 | Morris ........................ 148/551 |
| 4,406,717 A | * | 9/1983 | Vernam et al. .............. 148/440 |
| 4,412,870 A | * | 11/1983 | Vernam et al. .............. 148/691 |
| 4,456,491 A | | 6/1984 | Adams et al. ............... 148/551 |
| 4,542,280 A | | 9/1985 | Simons ....................... 219/137 |
| 4,630,352 A | * | 12/1986 | Ginzburg et al. ........... 29/527.7 |
| 4,675,974 A | * | 6/1987 | Connolly .................... 29/527.7 |
| 4,797,164 A | | 1/1989 | Hollrigl et al. ............. 148/552 |
| 4,814,022 A | | 3/1989 | Constant et al. ............ 148/551 |
| 4,958,677 A | * | 9/1990 | Kimura ....................... 164/452 |
| 4,976,024 A | * | 12/1990 | Kimura ....................... 29/527.6 |
| 5,244,516 A | | 9/1993 | Kawaguchi ................. 148/551 |
| 5,441,582 A | * | 8/1995 | Fujita et al. ................ 148/693 |
| 5,460,666 A | * | 10/1995 | Fujita et al. ................ 148/693 |
| 5,480,498 A | | 1/1996 | Beaudoin et al. .......... 148/549 |
| 5,514,228 A | | 5/1996 | Wyatt-Mair et al. ....... 148/551 |
| 5,607,524 A | | 3/1997 | Klemp et al. ............... 148/521 |
| 5,672,286 A | | 9/1997 | Seeds .......................... 219/137 |
| 5,681,405 A | | 10/1997 | Newton et al. ............. 148/551 |
| 5,785,777 A | * | 7/1998 | Cantrell et al. ............. 148/694 |
| 5,833,775 A | | 11/1998 | Newton et al. ............. 148/551 |
| 5,857,916 A | | 1/1999 | Schoch et al. .............. 464/183 |
| 5,951,794 A | | 9/1999 | Dickson, Jr. ................ 148/690 |
| 5,961,752 A | | 10/1999 | Bergsma ..................... 148/550 |
| 5,985,058 A | | 11/1999 | Selepack et al. ............ 148/551 |
| 5,993,573 A | | 11/1999 | Selepack et al. ............ 148/551 |

(Continued)

FOREIGN PATENT DOCUMENTS

JP          JP 0627 1969 A   *   9/1994    ........... C22C 21/06

*Primary Examiner*—Essama Omgba
(74) *Attorney, Agent, or Firm*—Andrew Alexander

(57) ABSTRACT

A method for producing aluminum drive shafts from molten aluminum alloy using a continuous caster to cast the alloy into a slab. The method comprises providing a molten aluminum alloy consisting essentially of 0.2 to 0.8 wt. % Si, 0.05 to 0.4 wt. % Cu, 0.45 to 1.2 wt. % Mg, 0.04 to 0.35 wt. % Cr, 0.7 wt. % max. Fe, 0.15 wt. % max. Mn, 0.25 wt. % max. Zn, 0.15 wt. % max. Ti, the remainder aluminum, incidental elements and impurities and providing a continuous caster such as a belt caster for continuously casting the molten aluminum alloy. The molten aluminum alloy is cast into a slab which is rolled into a sheet product. After solution heat treatment, the sheet product is formed into a tube having a seam which is welded to provide a seam welded tube. The seam welded tube is placed in a forming die and hydroformed to form the drive shaft.

55 Claims, 6 Drawing Sheets

U.S. PATENT DOCUMENTS

| | | |
|---|---|---|
| 6,086,690 A | 7/2000 | Wycliffe et al. ............ 148/552 |
| 6,223,415 B1 * | 5/2001 | Shin et al. ................. 29/527.5 |
| 6,248,188 B1 * | 6/2001 | Smolej et al. .............. 148/417 |
| 6,264,765 B1 | 7/2001 | Bryant et al. ............... 148/511 |
| 6,325,870 B1 * | 12/2001 | Kashiwazaki et al. ...... 148/439 |
| 6,344,096 B1 | 2/2002 | Baumann et al. ........... 148/551 |
| 6,368,427 B1 * | 4/2002 | Sigworth .................... 148/439 |
| 6,423,163 B2 * | 7/2002 | Smolej et al. .............. 148/550 |
| 6,502,480 B1 * | 1/2003 | Walker et al. ............ 74/579 E |
| 6,543,122 B1 * | 4/2003 | Perkins et al. ............. 29/527.7 |
| 6,613,167 B2 * | 9/2003 | Magnusen et al. .......... 148/693 |
| 6,716,390 B2 * | 4/2004 | Bekki et al. ................ 420/532 |
| 6,726,785 B2 * | 4/2004 | Oyama et al. .............. 148/439 |
| 6,732,434 B2 * | 5/2004 | Luo et al. .................. 29/897.2 |
| 2001/0020500 A1 * | 9/2001 | Smolej et al. .............. 148/550 |
| 2001/0031376 A1 * | 10/2001 | Fulton et al. ............... 428/650 |
| 2002/0043312 A1 * | 4/2002 | Kashiwazaki et al. ...... 148/552 |
| 2003/0190252 A1 * | 10/2003 | Sigworth .................... 420/541 |
| 2005/0019205 A1 * | 1/2005 | Davisson et al. ........... 420/540 |

* cited by examiner

ALUMINUM AUTOMOTIVE DRIVE SHAFT

BACKGROUND OF THE INVENTION

This invention relates to automotive drive shafts and more particularly, it relates to a method of using a continuous caster such as a belt caster for casting aluminum alloy into a slab which is rolled into sheet for forming into automotive drive shafts. Further, the invention relates to improved tubular members used for making such drive shafts and an improved method of making the tubular members.

To improve fuel economy, there is an intense effort to lightweight automobiles and trucks by replacing steel components with aluminum components. However, sometimes the fabrication practice for the aluminum members can become so expensive as to greatly diminish the benefit of the weight savings of the aluminum components. Thus, there is a great need for improved aluminum fabrication practices which minimize the cost of producing the aluminum components. This is particularly true in the fabrication of automotive drive shafts. Drive shafts are used to transmit torque from the transmission of an automobile or truck to the rear axle in rear-wheel drive vehicles or to front and rear axles in four-wheel drive vehicles such as trucks.

Different techniques have been suggested for fabricating aluminum drive shafts. For example, U.S. Pat. No. 5,607,524 discloses methods for making an aluminum drive shaft for automobiles or trucks or other drive shaft applications from aluminum alloy tube and methods for making said tube including using an aluminum alloy containing about 0.5 to 1.3% magnesium, about 0.4 to 1.2% silicon, and about 0.6 to 1.2% copper and preferred practices for making the tube. The preferred practices include extrusion temperature and other aspects of extrusion, along with cold drawing. One preferred practice includes reducing tube diameter and increasing wall thickness at one or both ends of the drive shaft tube shortly after solution heating and quenching and applies to various 6000 Series type aluminum alloys.

U.S. Pat. No. 4,542,280 discloses a method of welding a pair of aluminum drive shaft components together.

U.S. Pat. No. 5,672,286 discloses a drive shaft assembly which includes an aluminum torque tube and aluminum yokes that are arc welded to the ends of the torque tube.

U.S. Pat. No. 5,857,916 discloses a drive shaft for motor vehicles in the form of a pipe consisting of aluminum. The drive shaft is a straight seam welded pipe consisting of a strain-hardening aluminum alloy. The pipe is straight seam welded without incorporation of additional materials and the wall thickness of the pipe is greater than 2 mm.

U.S. Pat. No. 5,951,794 discloses methods for making an aluminum drive shaft for automobiles or trucks or other drive shaft applications from aluminum alloy tube.

AA6061 has been used for drive shafts and contains, according to the Aluminum Association (AA) registered limits, 0.4 to 0.8 wt. % Si, 0.8 to 1.2 wt. % Mg, 0.15 to 0.4 wt. % Cu, 0.04 to 0.35 wt. % Cr, incidental elements and impurities, all set forth in AA and are incorporated herein as if specifically set forth. However, the tube is derived usually from ingot or billet material wherein the billet is extruded to form a tube. However, in many instances DC cast ingot or billet material has a higher total conversion cost associated with it when compared to continuous casting of molten aluminum into slab utilizing twin belt or twin roll casters. Typically, the slab has a width of 12 to 72 inches and a thickness of about 0.25 to about 1 or 2 inches.

Continuous casting of molten aluminum and rolling slab produced therefrom into a sheet product is disclosed in various patents. For example, U.S. Pat. No. 5,976,279 discloses a process for continuously casting aluminum alloys and improved aluminum alloy compositions. The process includes the steps of continuously annealing the cold rolled strip in an intermediate anneal using an induction heater and/or continuously annealing the hot rolled strip in an induction heater. The alloy composition has mechanical properties that can be varied selectively by varying the time and temperature of a stabilizing anneal.

U.S. Pat. No. 4,456,491 discloses a method of continuously casting a molten metal in a casting means to obtain a solidified cast bar at a hot-forming temperature, passing the cast metal at a hot-forming temperature from the casting means to a hot-forming means, and hot forming the cast bar into a wrought product by a two-stage reduction of its cross-sectional area while it is still at a hot-forming temperature, including, in the first stage, the step of forming a substantially uniform subgrain or cell structure in the outer surface layers of the cast bar by a selected small amount of deformation of the cast bar in its as-cast condition prior to the second stage in which substantial reduction of its cross-sectional area forms the wrought product.

U.S. Pat. No. 5,681,405 discloses an aluminum alloy sheet and a method for producing an aluminum alloy sheet. The aluminum alloy sheet is useful for forming into drawn and ironed container bodies. The sheet preferably has an after-bake yield strength of at least about 37 ksi and an elongation of at least about 2 percent. Preferably the sheet also has earing of less than about 2 percent.

U.S. Pat. No. 5,961,752 discloses an improved aluminum base alloy comprising an improved aluminum base alloy comprising 0.2 to 2 wt. % Si, 0.3 to 1.7 wt. % Mg, 0 to 1.2 wt. % Cu, 0 to 1.1 wt. % Mn, 0.01 to 0.4 wt. % Cr, and at least one of the elements selected from the group consisting of 0.01 to 0.3 wt. % V, 0.001 to 0.1 wt. % Be and 0.01 to 0.1 wt. % Sr, the remainder comprising aluminum, incidental elements and impurities. Also disclosed are methods of casting and thermomechanical processing of the alloy.

U.S. Pat. No. 4,797,164 discloses a process for manufacturing a fine-grained recrystallized sheet of heat-treatable, i.e., age-hardenable aluminum alloy containing an addition of at least one of the elements Ti, Zr, Hf, V, Nb, Ta, Cr, Mo, W amounting in total to 0.08–1.50%, the alloy is brought into a condition A in which the alloying elements that lead to age-hardening and the above mentioned additive elements are, at least for the greater part, in solid solution, following which in step B the incoherent hardening phases are precipitated out in a temperature range between the solvus $T_{gps}$ and the solvus $T_s$, and in a subsequent step C the aluminides of the above mentioned elements are precipitated as a very dense uniform dispersion by heating in a temperature range between 300° C. and $T_s$ −30° C., whereby any deformation by rolling may take place between condition A and step C at temperatures not higher than $T_s$−30° C., and in which process the temperature of the sheet below a thickness or 2.5×d does not exceed 200° C., and the sheet at thickness d is heated to a recrystallization treatment D such that the heating rate is at least 20° C./s until above the recrystallization threshold.

U.S. Pat. No. 4,814,022 discloses a weldable aluminum alloy workable into sheet form containing Si, Mg and Cu, and a process for its production. The alloy contains Cu: 0.1–0.5; Mn: 0–0.2; Ti: 0–0.1; Fe: 0–0.35; other impurities each: ≦0.05 total impu content: ≦0.15 balance Al. The production procedure comprises semi-continuous or continuous casting of blanks, an optional homogenisation operation, a hot transformation operation which is terminated in the range of 270° to 340° C., an optional cold transformation operation, a complete solution treatment, a shaping operation using stamping or pressing, folding, bending, etc., and a tempering operation.

U.S. Pat. No. 5,480,498 discloses a method of producing aluminum alloy sheet product includes casting a slab, homogenizing the cast slab, and hot rolling the homogenized slab to provide an intermediate gauge product. The temperature and other operating parameters of the hot rolling process are controlled so that the temperature of the intermediate gauge product exiting the hot rolling step is between about 500° F. and 650° F. Preferably, the temperature does not exceed 575° F. The intermediate gauge product is then subjected to a cold reduction of 45% to 70%, annealed, and cold rolled to final gauge.

U.S. Pat. No. 6,344,096 discloses a method of producing an aluminum alloy sheet which, in one embodiment, includes roll casting an aluminum alloy strip having a thickness of less than about 0.5 inch and, subsequently, preferably without intervening thermal treatments or surface cleaning, cold rolling the strip to a thickness of less than about 0.15 inch, after which the cold rolled strip is subjected to thermal treatment which is preferably either continuous annealing or solution heat treatment. The aluminum alloy, in a continuous annealing embodiment, is preferably selected from the group consisting of the 3XXX and 5XXX series. In another embodiment wherein solution heat treatment is employed, the aluminum alloy is preferably selected from the group consisting of 2XXX and 6XXX. The sheet may be converted into a motor vehicle body panel.

U.S. Pat. No. 6,264,765 discloses a method and apparatus for casting, hot rolling and annealing non-heat treatment aluminum alloys. The method and apparatus comprises continuous casting, hot rolling and in-line inductively heating the aluminum sheet to obtain the mechanical properties within the specification tolerance of the hot rolled product.

U.S. Pat. No. 5,985,058 discloses a process for continuously casting aluminum alloys and improved aluminum alloy compositions. The process includes the step of heating the cast strip before, during or after hot rolling to a temperature in excess of the output temperature of the cast strip from the chill blocks. The alloy composition has a relatively low magnesium content yet possesses superior strength properties.

U.S. Pat. No. 5,993,573 discloses a process for continuously casting aluminum alloys and improved aluminum alloy compositions. The process includes the steps of (a) heating the cast strip before, during or after hot rolling to a temperature in excess of the output temperature of the cast strip from the chill blocks and (b) stabilization or back annealing in an induction heater of cold rolled strip produced from the cast strip.

U.S. Pat. No. 5,833,775 discloses an aluminum alloy sheet and a method for producing an aluminum alloy sheet. The aluminum alloy sheet is useful for forming into drawn and ironed container bodies. The sheet preferably has an after-bake yield strength of at least about 37 ksi and an elongation of at least about 2 percent. Preferably the sheet also has earing of less than about 2 percent.

U.S. Pat. No. 6,086,690 discloses a process of producing an aluminum alloy sheet article of high yield strength and ductility suitable, in particular, for use in manufacturing automotive panels. The process comprises casting a non heat-treatable aluminum alloy to form a cast slab, and subjecting said cast slab to a series of rolling steps to produce a sheet article of final gauge, preferably followed by annealing to cause recrystallization. The rolling steps involve hot and warm rolling the slab to form an intermediate sheet article of intermediate gauge, cooling the intermediate sheet article, and then warm and cold rolling the cooled intermediate sheet to final gauge at a temperature in the range of ambient temperature to 340° C. to form said sheet article. The series of rolling steps is carried out continuously without intermediate coiling or full annealing of the intermediate sheet article. The invention also relates to the alloy sheet article produced by the process.

U.S. Pat. No. 5,244,516 discloses an aluminum alloy plate for discs superior in Ni—P platability and adhesionability of plated layer and having a high surface smoothness with a minimum of nodules and micropits, said aluminum alloy plate comprising an aluminum alloy containing as essential elements Mg in an amount more than 3% and equal to or less than 6%, Cu in an amount equal to or more than 0.03% and less than 0.3%, and Zn in an amount equal to or more than 0.03% and equal to or less than 0.4%, and as impurities Fe in an amount equal to or less than 0.07% and Si in an amount equal to or less than 0.06% in the case of semi-continuous casting, or Fe in an amount equal to or less than 0.1% and Si in an amount equal to or less than 0.1% in the case of strip casting, and also containing Al—Fe phase intermetallic compounds, with the maximum size being smaller than 10 $\mu$m and the number of particles larger than 5 $\mu$m being less than 5 per 0.2 mm$^2$, and Mg—Si phase intermetallic compounds, with the maximum size being smaller than 8 $\mu$m and the number of particles larger than 5 $\mu$m being less than 5 per 0.2 mm$^2$.

U.S. Pat. No. 5,514,228 discloses a method for manufacturing aluminum sheet stock which includes hot rolling an aluminum alloy sheet stock, annealing and solution heat treating it without substantial intermediate cooling and rapid quenching.

In spite of these disclosures, there is a great need for selection of aluminum alloy and method for producing vehicular parts or members utilizing a continuous caster to produce slab, thermal mechanical processing of the slab into a sheet product to provide good strength and levels of formability which permit ease of forming intricate parts without cracking.

Typically, the drive shaft is comprised of a tubular member which is welded at each end to yokes for connecting to universal joints. The aluminum tubular member can have outside diameters ranging from about 2 inches to 7 inches. Wall thickness for the drive shaft tubular member can range from about 0.05 to 0.25 inch. Typically, wall thicknesses can range from about 0.06 to 0.14 inch, with even thicker gauges being used for heavier duty trucks.

The term "formability" when used herein is used to describe the ease with which a sheet of metal can be shaped through plastic deformation. Formability of a metal can be evaluated by measuring strength, ductility, and the amount of deformation to cause failure.

The term "aluminum" when used herein is meant to include aluminum and its alloys.

The term "automotive" as used herein is meant to include automobile and trucks and other transportation vehicles.

SUMMARY OF THE INVENTION

It is an object of the invention to provide an improved process including continuous casting and rolling to continuously produce aluminum sheet product having consistent levels of formability.

It is another object of the invention to provide a process including continuously casting a slab and rolling said slab into a sheet product suitable for forming into vehicular parts.

It is still another object of the invention to provide a process employing continuous casting of molten aluminum into slab and rolling the slab into sheet product for forming tube products suitable for forming into automotive drive shaft tubular members.

It is another object of the invention to provide a process for producing drive shafts which includes continuously casting an aluminum alloy into a slab and rolling the slab to a sheet product having good levels of formability and hydroforming drive shaft tubular members for use in said drive shafts.

It is yet another object of the invention to provide a process for producing vehicular members such as drive shaft tubular members which includes continuously casting an aluminum alloy into a slab, rolling the slab to a sheet product having good levels of formability, forming the sheet into a seam welded tube and hydroforming the tube into said tubular members.

And yet it is another object of the invention to provide a process for casting a molten alloy consisting essentially of 0.2 to 0.8 wt. % Si, 0.05 to 0.4 wt. % Cu, 0.45 to 1.2 wt %, 0.04 to 0.35 wt. % Cr, 0.7 wt. % max. Fe, 0.15 wt. % max. Mn, 0.25 wt. % max. Zn, 0.5 wt. % max. Ti, the remainder aluminum, incidental elements and impurities, casting the alloy into a slab which is hot rolled and solution heat treated to provide a sheet product for forming into a seam welded tube and hydroforming the seam welded tube into an automotive drive shaft tubular member.

In accordance with these objects there is provided a process for the production of an aluminum automotive drive shaft from a heat treatable aluminum alloy using a continuous caster to cast the alloy into a slab wherein in said production an aluminum drive shaft tube member is joined to end members to form the drive shaft. The aluminum drive shaft tube member is made by the method comprising providing a molten aluminum alloy consisting essentially of 0.2 to 0.8 wt. % Si, 0.05 to 0.4 wt. % Cu, 0.45 to 1.2 wt. % Mg, 0.04 to 0.35 wt. % Cr, 0.7 wt. % max. Fe, 0.15 wt. % max. Mn, 0.25 wt. % max. Zn, 0.15 wt. % max. Ti, the remainder aluminum, incidental elements and impurities, and providing a continuous caster for continuously casting the molten aluminum alloy. The molten aluminum alloy is cast into a slab having a thickness in the range of 0.1 to 2 inches which is hot rolled into a sheet product, solution heat treated and quenched. The sheet product is formed into a tube having a seam which is welded to provide a seam welded tube. The seam welded tube is placed in a forming die and hydroformed into the automotive aluminum drive shaft member. The tube member is aged to increase strength properties.

These and other objects will become apparent from a reading of the specification and claims appended hereto.

DETAILED DESCRIPTION OF PREFERRED EMBODIMENTS

Figure 1:
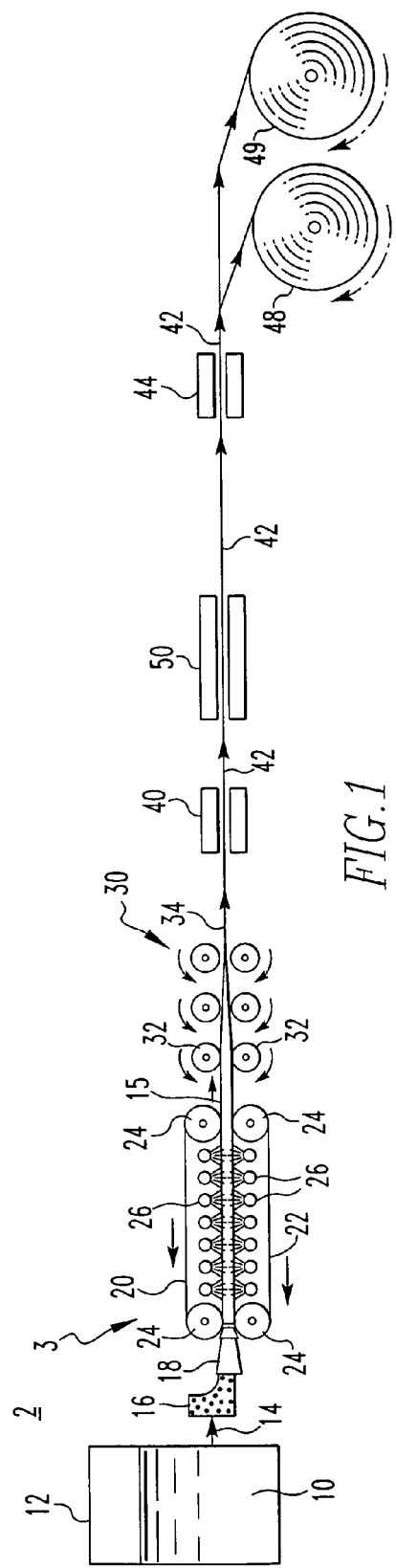
FIG. 1 is a schematic of a continuous caster, hot rolling mill and rolls of sheet material.

The automotive shaft tube member of the invention is comprised of an aluminum base alloy containing carefully controlled amounts of magnesium, silicon, copper and chromium with iron and manganese having controlled maximum limits. Further, the cast product or slab must be subject to controlled thermal mechanical processing to provide a sheet product which will permit operations such as forming and welding to produce the end product. For example, if the alloying elements are not controlled, then the difference in strength levels between the fabricating temper, e.g., T4, and the artificially aged temper, e.g., T6, is not maximized. That is, it is desired to maintain a significant difference in strength between the fabricating temper and the strength of the final product to facilitate forming operations and yet maintain high strength in the shaft tube member. Additionally, it is desired within the invention to form the shaft tube member without cracks resulting. Thus, it is important to obtain good levels of formability in the fabricating temper, e.g., T4.

Accordingly, there is provided an aluminum base alloy consisting essentially of 0.2 to 0.8 wt. % Si, 0.05 to 0.4 wt. % Cu, 0.45 to 1.2 wt. % Mg, 0.04 to 0.35 wt. % Cr, 0.7 wt. % max. Fe, 0.15 wt. % max. Mn, 0.25 wt. % max. Zn, 0.15 wt. % max. Ti, the remainder aluminum, incidental elements and impurities. Zn is preferably maintained less than 0.1 wt. % Other impurities are preferably limited to about 0.05 wt. % each and the combination of other impurities preferably should not exceed maximum of 0.15 wt. %. Preferably, magnesium is maintained in the range of 0.5 to 1.2 wt. % and silicon is preferably maintained in the range of 0.3 to 0.7 wt. %. Further, preferably iron is maintained in the range of 0.15 to 0.4 wt. % and copper is maintained in the range of 0.07 to 0.35 wt. %.

Thus, it will be understood that to use an alloy of the above composition in the process of the invention to form automotive drive shaft tube members having the requisite properties requires careful control of the alloying elements to provide for ease of shaping during the forming operation. It will be appreciated that in the present process, there can be great difficulty in balancing all the constituents in the alloy and procedural steps necessary to forming a sheet product having desirable properties for forming into the final product while avoiding undesirable properties which lead to cracking, for example, during the forming process.

As well as silicon being in the range of 0.4 to 0.8 wt. % and magnesium being in the range of 0.8 to 1.2 wt. %, it is preferred that magnesium be present in excess of the silicon. Within ranges set forth herein for magnesium and silicon, further preferences can be applied, depending largely on the properties desired in the end product.

All ranges set forth herein include all the numbers or tenths or hundredths of numbers within the range as if specifically set forth. For example, the range 0.8 to 1.2 includes 0.9, 1.0, 1.1 or 0.85, 0.95, 1.05, etc., as if specifically set forth.

In the natural aged or T4 condition, the alloy of the invention after proper casting, solution heat treatment, and quenching, but before artificial aging, can have a tensile strength in the range of 20 to 35 KSI and a minimum yield strength of 9 KSI and an elongation greater than 15%. After artificial aging, the alloy can have a tensile strength of greater than 35 KSI and a yield strength greater than 31 KSI. It will be noted that by artificially aging the strength of the automotive shaft tube member can be increased significantly. It is desired to maximize the difference between the fabricating or forming temper, e.g., T4, and the temper of the end product in order to allow for ease of fabrication and to be able to form or fabricate automotive shaft tube members without cracks resulting. This can be achieved in part by controlling the alloy and also by controlling casting and subsequent processing.

Copper in the subject alloy serves to increase the spread between fabricating or forming temper and the temper of the final product or automotive shaft tube member. Copper can be present in these ranges without unduly affecting the formability of the alloy in the T4 condition, for example. Copper present in these ranges increases the strength of the final automotive drive shaft member after artificially aging to T6, for example. Thus, copper does not add much strength to the T4 temper for the forming operation and yet adds to the final strength.

Not only is it important to have alloying elements and impurities in the controlled amounts as herein described, but the slab produced by continuous casting, the sheet formed from the slab and automotive shaft tube member formed from the sheet must be prepared in accordance with specific method steps in order to produce sheet and automotive shaft tube member or parts formed therefrom having the desirable characteristics. That is, the process must be carefully controlled in order to produce sheet or tube products having formability properties of DC ingot fabricated material without the cost penalties of the DC ingot process.

Thus, referring now to FIG. 1, there is shown a schematic illustration of a belt caster 2 and rolling mill for producing sheet suitable for forming into vehicular members in accordance with the invention.

In FIG. 1, molten aluminum alloy 10 as described is provided in a furnace or reservoir 12. Molten aluminum alloy from reservoir 12 is directed along line 14 to a tundish 16 from where it is metered through a nozzle 18 into an advancing mold created by revolving belts 20 and 22 and side dams (not shown). Belts 20 and 22 are turned by means of rolls 24. Molten metal is solidified to form a continuous slab 15 between belts 20 and 22 which are chilled using coolant spray 26. Belt caster 2 is described in U.S. Pat. Nos. 3,864,973; 3,921,697; 4,648,438; 4,940,076 and 4,972,900, incorporated herein by reference as if specifically set forth. Improved nozzles for a belt caster are set forth in U.S. Pat. No. 5,452,827, incorporated herein by reference.

Another casting apparatus that may be used in the present invention is a block caster wherein the blocks are connected to form belts and is included herein as a belt caster. As described with respect to belt caster 2, a tundish and nozzle are provided to transfer molten metal to the block belts of the block caster wherein solidification occurs to provide a solidified slab 15 and the blocks are chilled to aid in solidification of the molten metal.

Yet another apparatus that may be utilized to cast a continuous strip or slab 15 is a roll caster which includes two rolls which rotate to provide the continuously advancing mold. As in the belt caster, a tundish and nozzle are used to transfer molten aluminum to the mold defined by the two rolls. Again, the rolls are normally chilled to aid in solidification of the molten metal into a strip or slab. The different casters are described in U.S. Pat. No. 5,452,827.

Molten aluminum alloy of the invention is introduced to the caster in a temperature range of about 1240° to 1320° F., typically 1250° to 1300° F., and exits the caster at a temperature in the range of 750° to 1150° F., typically 860° to 1100° F. In addition, typically the continuous slab exiting the belt caster has a thickness in the range of 0.1 to 2 inches, for example, 0.2 to 1 inch. A typical thickness is about 0.6 to 0.9 inch. Slab width can range from 12 to 78 inches. Slab casting speed can range from 10 to 30 ft/min, depending on the thickness of the slab. It is important to adhere to these casting conditions in order to obtain the microstructure for purposes of formability. It should be noted that DC cast material normally has better formability because of a more suitable microstructure. But, as noted earlier, DC cast material has the penalty of higher conversion costs than the subject continuous cast slab. Thus, the present invention provides continuous cast slab for forming into sheet material with similar to DC cast properties to obtain the cost savings and yet retain the desirable properties.

After exiting the caster, the slab 15 is directed to rolling mill 30 where it is rolled to form a rolled strip or flat product 34 using preferably a hot mill. Hot mill 30 is comprised of one or more pairs of oppositely opposed rolls 32 which reduces the thickness of the slab a controlled amount as it passes between each stand of rolls. Three sets of hot stands or rolls are illustrated in FIG. 1. For example, slab 15 having a thickness of about 0.2 to 1 inch would be reduced to a sheet product having a thickness of about 0.04 to 0.25 inch. Typically, for automotive shaft tube members the sheet product would have a thickness in the range of 0.05 to 0.25 inch, for example, 0.06 to 0.14 inch. The temperature of the slab entering hot mill 30 would typically be in the range of about 700° to 1100° F., if no heat is added. Typically, temperature of sheet product exiting mill 30 would be in the range of 350° to 700° F. In another aspect of the invention, the slab from caster 3 may be heated (not shown in FIG. 1) to a temperature of 800° to 1100° F. to improve the microstructure of the slab prior to hot rolling. Thus, slab entering the hot mill can have temperatures of about 800° to 1100° F.

Hot mill 30 can reduce the thickness of the slab about 60 to 95% of its original thickness, with typical reduction being 80 to 95% reductions. Heat may be applied to the strip or slab between hot stands in addition to or instead of heating prior to the hot mill.

The temperature of the aluminum alloy sheet exiting the hot mill can be in the range of about 425° to 950° F., depending on whether there was heat input before or during hot rolling.

After rolling, rolled strip 34 can have a deformation texture and grain structure which is a highly worked structure containing subgrains. The rolled strip can have a fully recrystallized grain structure with an optimum texture depending on previous heat input and rolling reduction. If the structure remains deformed and a recrystallized grain structure is necessary for the end product, then solution heat treatment of the rolled strip 34 can be applied to promote recrystallization of the worked structures. For example, it is important for the automotive shaft tube member using this aluminum alloy to have a fine, fully recrystallized grain structure with random texture for the purpose of forming automotive shaft tube member in accordance with the invention.

After hot rolling, the hot rolled sheet may be subjected to homogenization, preferably at metal temperatures in the range of 800° to 1000° F. for a time period of at least one hour in order to dissolve magnesium and silicon or other soluble elements and to homogenize the internal structure of the metal. A preferred time period is two hours or more at the homogenization temperature. After the homogenization, the sheet can be further rolled as by cold rolling to the required gauge for the automotive shaft tube member to a gauge in the range of 0.06 to 0.2 inch. Thus, it will be understood that the slab can be hot rolled to the required gauge for forming or it can be hot rolled to an intermediate gauge which may be homogenized before cold rolling to the final gauge for forming.

After rolling the slab to the desired thickness either by hot rolling or the combination of hot rolling and cold rolling, the rolled sheet is subjected to a solution heat treatment to substantially dissolve soluble elements. The solution heat treatment is carried out in a temperature range of 800° to 1000° F. and normally produces a recrystallized grain structure. A preferred solution heat treatment temperature range is 850° to 1000° F.

Solution heat treating can be accomplished in batches or continuously and can occur in as little as a few seconds once the metal has reached the solution heat treating temperature. In continuous heat treating operation, sheet 34 (FIG. 1) is passed through a furnace 40 or several furnaces of sufficient length to bring the sheet to solution heat treating temperature. As noted, once the sheet reaches solution heat treating temperature, solutionizing can occur in 5 to 10 seconds. Of course, longer times can be used such as several minutes, e.g., 5 minutes, without detrimental effects. Thereafter, the sheet is rapidly quenched to minimize uncontrolled precipitation of $Mg_2Si$ to enhance strength and formability to the final product. Thus, quench rates can range from 15° F./sec. to as fast as 325° F./sec., with faster quench rates being preferred, at least until the metal reaches about 200° F. after which it may be air cooled. The quench rates may be obtained with cold water quenches provided in the form of cold water sprays. That is, solution heat treated sheet 42 may be quenched continuously with cold water sprays 50 to provide for the desired quench rate.

After quenching, the sheet product may be stretched to improve flatness and to remove buckles. However, stretching should be kept to a minimum because it is a form of working which lowers the formability desired for subsequent forming operations.

Referring to FIG. 1, it will be seen in the embodiment illustrated that the hot rolled sheet product is directed to a continuous solution heat treater 40, using a heater such as an infrared, solenoidal or transverse flux induction heater. While any continuous heater may be used, an induction heater is preferred. While hot rolling of continuous cast slab may provide the required crystallographic texture, such as preferred grain orientation and grain structure, such as shape and size, continuous solution heat treating can be used to ensure the desired mechanical properties of the sheet product. Continuous solution heat treating may also be required if cold rolling (not shown in FIG. 1) of the hot rolled strip is necessary.

Instead of continuous solution heat treating, the rolled sheet may be batch solution heat treated. That is, hot rolled sheet 42 is wound into rolls or coils 48 or 49. These rolls are then placed in a furnace and heated in a temperature range of 800° to 1000° F. for 3 to 10 hours to solutionize the rolled sheet.

As noted, after hot rolling, the hot rolled sheet or flat product may be allowed to cool prior to other operations. For example, after hot rolling, with or without homogenization and cooling, the resulting strip 42 may be cold rolled (not shown in FIG. 1) to a sheet product having a final gauge used for forming. The cold rolling may be achieved by passing strip 42 through several pairs or stands comprising a cold mill to provide the cold rolling required to produce the final gauge. Cold rolling can reduce the thickness of strip 42 by 20% to 90%. Final gauge of the sheet can range from 0.06 to 0.2 inch, typically 0.08 to 0.18 inch, for forming into automotive shaft tube members. It will be appreciated that the cold rolling can be performed in a cold rolling line separate from the subject continuous casting and rolling line.

After solution heat treating, sheet 42 is subject to a continuous rapid quenching such as cold water quench 50 prior to further operations.

Figure 2:
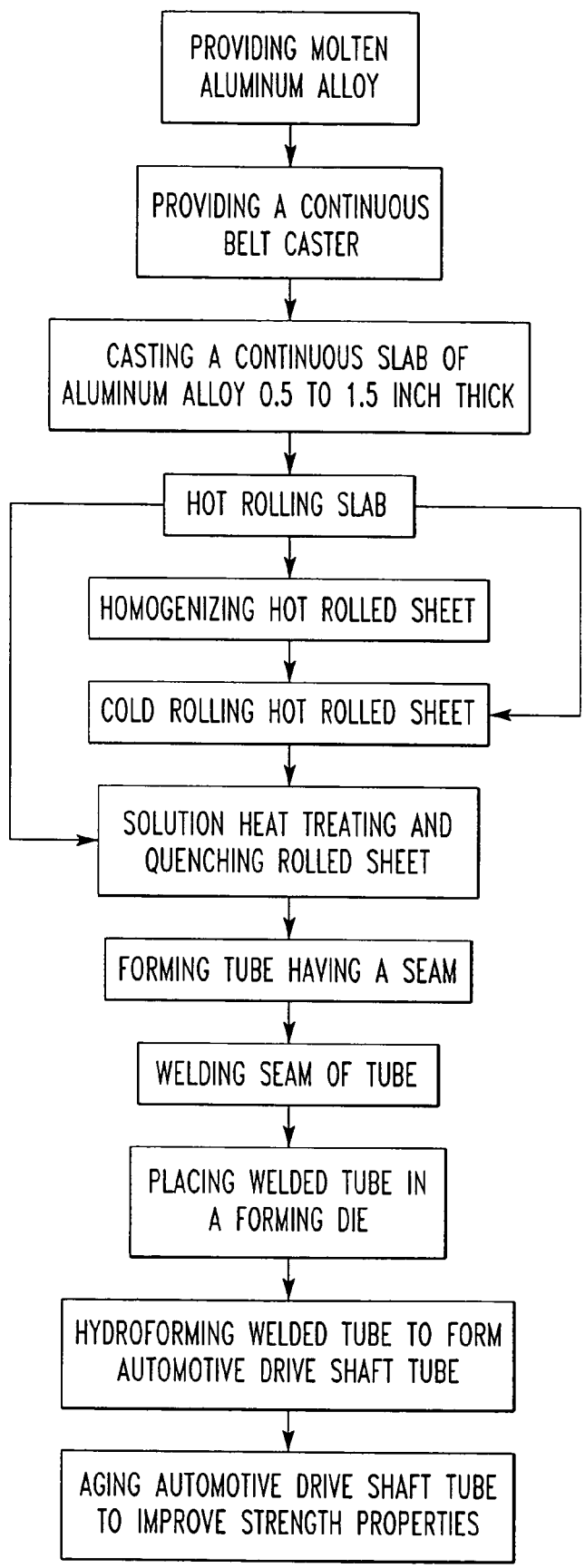
FIG. 2 is a flow chart showing steps in forming automotive drive shaft tube member.

Steps illustrative of the invention are set forth in FIG. 2. It will be seen in FIG. 2 that after solution heat treating and quenching, rolled sheet is formed into the shape of a tube having a seam. It will be understood that the solution heat treated and quenched sheet is first cut in shear 44 into coils and then slit to the appropriate width prior to forming into seamed tube, depending on the application. Thereafter, the seam is welded to form a welded tube. Any form of welding may be employed that provides a high quality weld. Automated machine welders may be employed and the seam MIG (metal inert gas) or TIG (tungsten inert gas) welded. The sheet may be slit and continuously formed and welded into tube which is cut to the desired length.

After the tube is welded, it is cut to length to provide a blank which fits the forming die. In order to avoid weakness in the automotive shaft tube member, the design of the die is selected in order that all transverse cross-sections of the profile of the automotive shaft tube member are smooth and continuous and preferably do not include sharp corners which would give rise to stress concentrations. The blank is placed in a die and the die is closed. Both ends of the tube are closed. Internal pressure is applied to the tube after the die is closed by introducing liquid such as water or oil to the inside of the tube. Sufficient pressure is applied to the inside of the tube to expand the tube to fit the circular-shaped cavity of the die to form the automotive shaft tube member having a continuous circular-shaped cross section (see FIG. 5).

Figure 3:
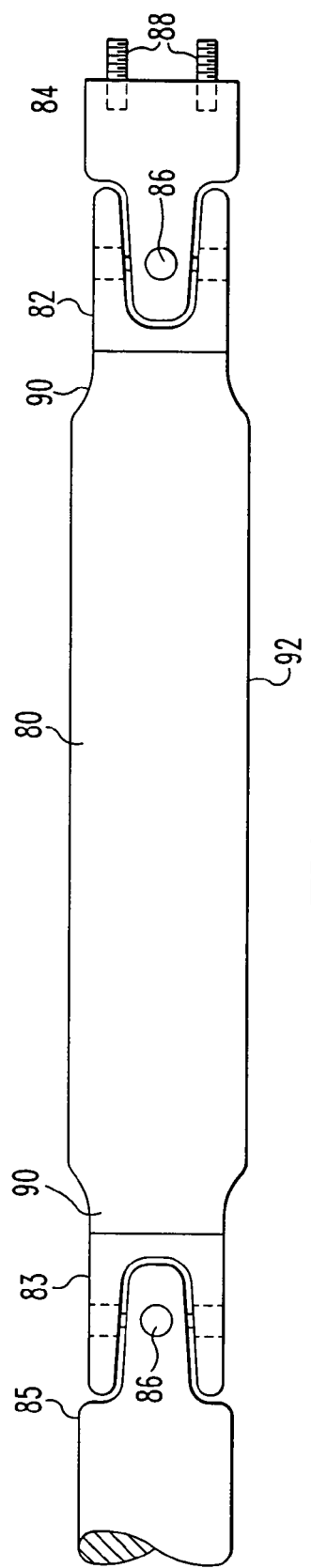
FIG. 3 is a schematic of a drive shaft showing attached yoke and universal coupler in accordance with the invention.

An aluminum automotive drive shaft suitable for trucks is illustrated in FIG. 3. The embodiment shown in FIG. 3 is comprised of a tubular portion or shaft tubular member 80 and two yoke members 82 and 83 joined to tubular member 80. Yoke member 82 is shown joined to a second member 84 using a universal joint 86. Second member 84 has bolts 88 for securing the drive shaft to transmission or axle (not shown). Yoke member 83 is shown attached to shaft member 85 using universal joint 86. Shaft member 85 is usually provided with inside or outside splines which permits drive shaft 80 to slide in and out of tail shaft (not shown) of the transmission, for example, as the suspension of the vehicle rises and falls. Other means of attaching the drive shaft may be employed. Yoke members 82 and 83 may be cast or forged out of the same aluminum alloy as tube 80 for purposes of joining or welding thereto.

Figure 9:
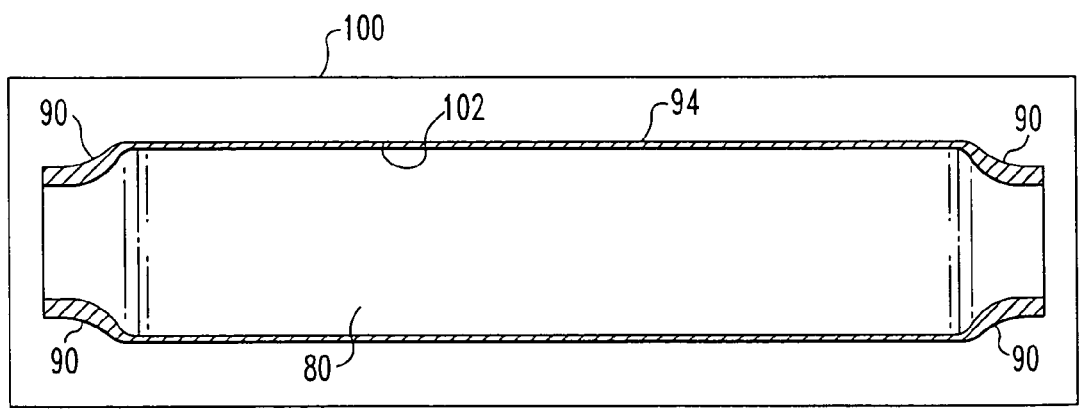
FIG. 9 is a cross-sectional view showing the drive shaft after hydroforming.

By inspection of FIG. 9, it will be seen that aluminum shaped tube member 80 has end portions 90 having a smaller diameter than the diameter of the region or portion 94 located between the end portions. Having the larger diameter has the benefit of increasing the stiffness of tube member 80. This in turn can increase the critical speed and resonance frequency of the drive shaft to a level that eliminates or greatly diminishes noise vibration in the vehicle at normal cruising speeds. Also, end portions 90 have a greater wall thickness than portion 94. Having a greater wall thickness at end 90 improves fastening or weldability of the tube to the yoke members. That is, welding can lower the strength of tube and thus the thicker wall compensates for any lowered strength.

Figure 6:
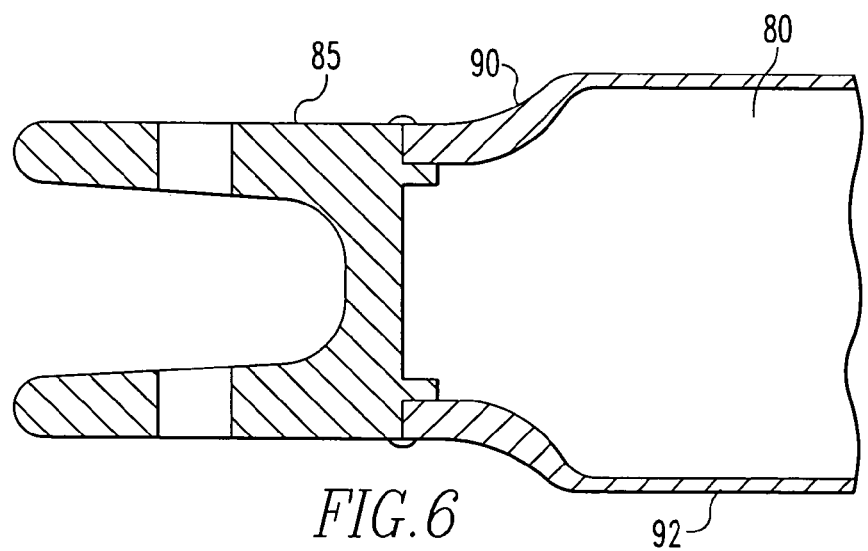
FIG. 6 is a cross-section illustrating an end having a yoke attached to the shaft tube member.

FIG. 6 shows an enlarged view of yoke member 83 attached to aluminum shaped tube member 80. It will be noted that yoke member 83 is abutted against wall portion 90 which has a thicker wall which facilitates welding. Joining or welding yoke member 83 to aluminum shaped tube member 80 is described, for example, in U.S. Pat. No. 4,542,280 fully incorporated herein by reference as if fully set forth. Welding may be accomplished using methods referred to for seam welding.

Figure 4:
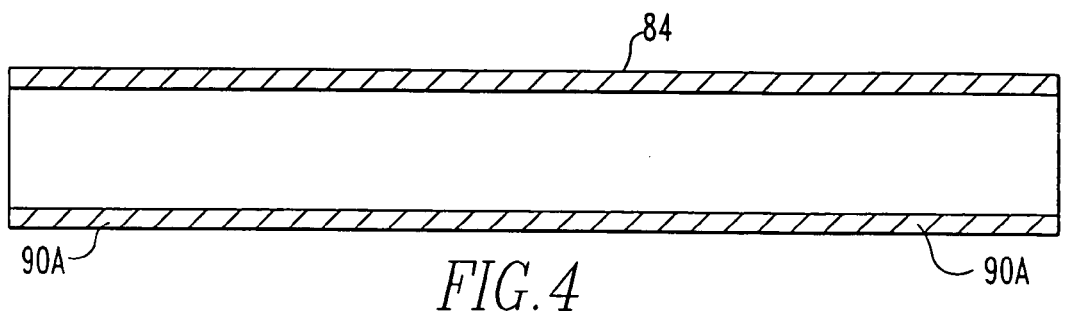
FIG. 4 is a schematic of a cross section of a tube used for forming the drive shaft tube member.

Seam welded tube member 94 is illustrated in cross section in FIG. 4 having a uniform wall thickness which in some instances may be used as an automotive drive shaft member without having thicker portions at the ends and may be used having a uniform diameter as shown in FIG. 4. As noted earlier, it is preferred to have the end portions employ thicker walls or the central regions of aluminum shaped tube member employ thinner walls. That is, the central regions should employ a larger diameter tube which can result in a thinner wall section of the tube. The formed aluminum shaped tube member 80 is illustrated (without yoke members) in FIG. 5 having thicker wall sections 90.

Figure 5:
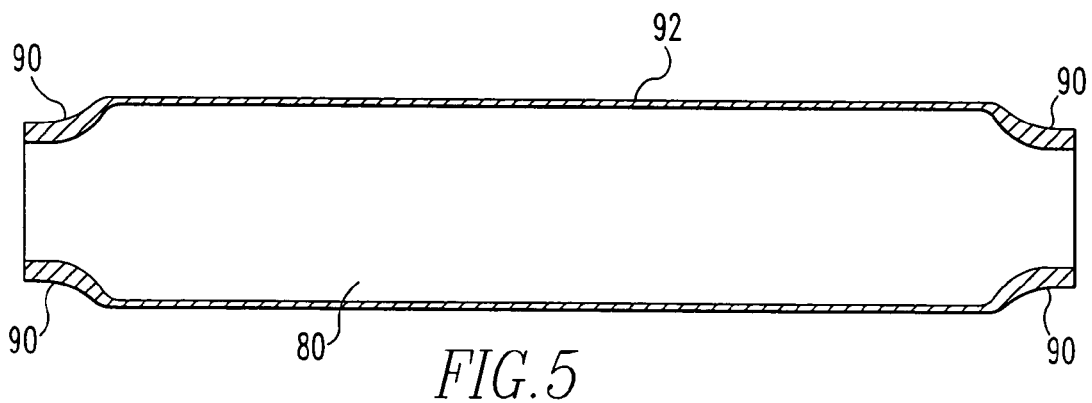
FIG. 5 is a cross-section of a formed automotive drive shaft tube member in accordance with the invention.
Figure 7:
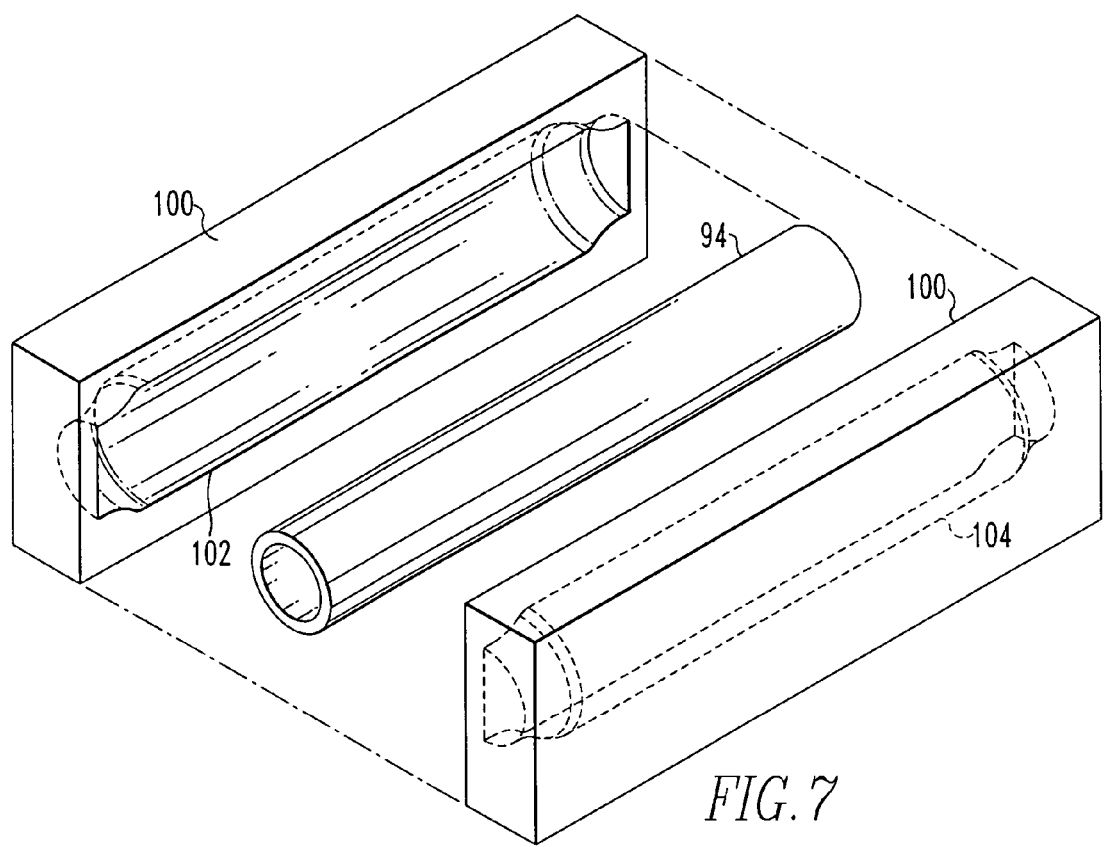
FIG. 7 is a schematic illustrating the tube of FIG. 4 and hydroforming dies prior to closing the dies.

One method of forming aluminum shaped tube member 80 includes hydroforming. This method is illustrated in FIG. 7 where tube 94 shown in expanded view located between dies 100. The dies are provided with cavities 102 and 104 which represent the shape of automotive shaped tube member 80 as shown in FIG. 5. Both halves of the dies are brought together or closed and sufficient pressure applied to force tube 94 to conform to the automotive tubular shaft member configuration. Methods of hydroforming are disclosed in U.S. Pat. Nos. 4,829,803; 4,567,743 and 6,257,035, incorporated herein by reference.

Figure 8:
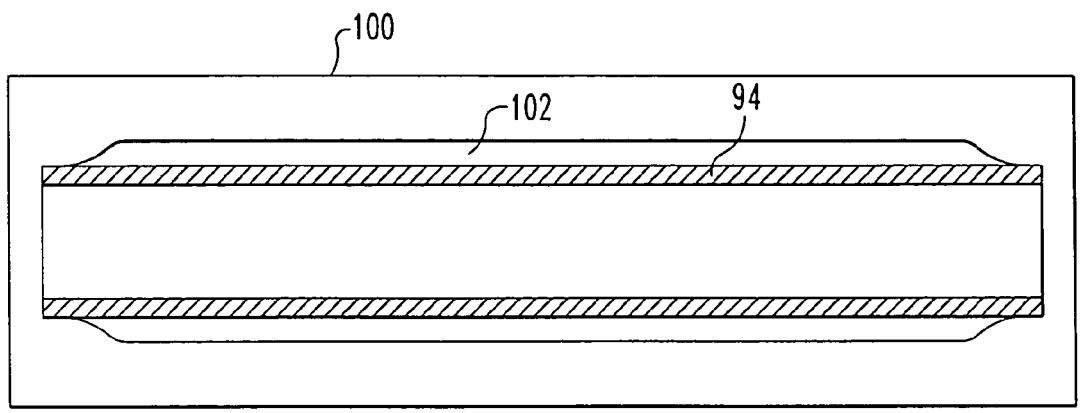
FIG. 8 is a cross-section showing the tube of FIG. 4 and hydroforming die prior to the hydroforming operation.

Tube 94 is shown in FIG. 8 in cavity 102 of forming die 100 prior to the forming operation. After the dies have been closed, tube 94 is hydroformed to fill the cavity in the die.

When tube 94 is formed, wall portion 92 typically has a thickness in the range of 0.06 to 0.2 inches and end portions 90 have a wall thickness in the range of 0.07 to 0.25 inches or even thicker with a tapered wall thickness provided between these two regions of thinner and thicker walls.

It will be understood that hydroforming operates to thin the wall at portion 92 as it expands tube 94 to fill the die cavity. Thus, it is important that the alloy have good elongation properties. That is, expansion of tube 94 should not extend beyond the elongation level, otherwise cracking can occur. If extensive wall thinning or increased diameter is desired, then the operation can be done in steps wherein after the first step, the tube is solution heat treated prior to further thinning or working of central region 92. It will be appreciated that the wall thickness of end portion 90 remains the same as region 92 expands resulting in the different wall thickness. It is within the scope of the invention to thin tube 94 which results in portions 90 and 92, but thinning the end portion 90 to a lesser extent to produce a thicker wall at the end portion.

In yet another method, wall thickness at end portions 90 can be obtained by another process. That is, sheet may be rolled to the thickness desired for central portion 92 and the tube formed by seam welding. To obtain a thicker end portion for purposes of welding, the diameter of tube 94 at the end or ends can be decreased to provide a local thicker wall. Thus, end portions 90A of tube 94 can be worked to increase wall thickness at the end regions. The thickened wall usually results in a decrease in outside and inside diameters substantially as shown in FIG. 5. It is preferred that the work to thicken the wall in the end regions to provide a variable thickness be performed in the solution heat treated and quenched condition to provide for relative ease of metal flow during working.

Thus, in accordance with this aspect of the invention, wall thickness at the end or end regions can be achieved by swaging or similar operation which reduces or tapers the diameter of tube 94 down to a smaller diameter accompanied with a thicker wall suitable for attaching or welding to yoke 82 or 83. Swaging is an operation wherein dies are hammered rapidly against the outside of the tube, thereby reducing the outside and inside diameters at the end regions accompanied by increased wall thickness. An inside mandrel may be used to support the tube to provide for a smooth inside finish on the reduced inside diameter to provide for a more precise fitting of the yoke member. Thus, the swaging operation provides for necking down of the outside diameter to provide a suitable wall thickness. Typically, the last 3 to 6 inches including the taper can be necked down to provide an aluminum shaped tube member. It will be understood that tapered portion extends from the larger diameter region having a typical thickness of about 0.08 or 0.09 to the thicker end region having a typical wall thickness of 0.09 to 0.15, depending on the application, thickness and diameter of the starting tube.

Another method of tapering down the original or outside diameter of the tube at the end or end regions includes pushing the end region of the welded tube through a reducing die to reduce the original diameter for purposes of increasing the thickness of the wall in the end region. This is sometimes referred to as push pointing. The operation of swaging or push pointing can be used to reduce the original diameter up to 20%.

After forming the aluminum shaped tube member, the formed member can be artificially aged to improve strength properties. This artificial aging is referred to as a T6 condition. Thus, tube member is subjected to a temperature in the range of 230° to 525° F. for a period of a few minutes to a few hours. That is, the tube member can be subject to this temperature for a period sufficient to provide the required strength. Such period can extend from about 5 minutes to 50 hours. Artificial aging can be obtained in a temperature range of 300° to 450° F. for a time in the range of 20 to 30 minutes. After artificial aging, the tube member can have a tensile yield strength in the range of 20 to 45 KSI.

Having described the presently preferred embodiments, it is to be understood that the invention may be otherwise embodied within the scope of the appended claims.

What is claimed is:

1. In the production of an aluminum automotive drive shaft from a heat treatable aluminum alloy using a continuous caster to cast the alloy into a slab wherein in said production an aluminum drive shaft tube member is joined to end members to form the drive shaft, the aluminum drive shaft tube member made by the method comprising:

(a) providing a molten aluminum alloy consisting essentially of 0.2 to 0.8 wt. % Si, 0.05 to 0.4 wt. % Cu, 0.45 to 1.2 wt. % Mg, 0.04 to 0.35 wt. % Cr, 0.7 wt. % max.

Fe, 0.15 wt. % max. Mn, 0.25 wt. % max. Zn, 0.15 wt. % max. Ti, the remainder aluminum, incidental elements and impurities;
(b) providing a continuous caster for continuously casting said molten aluminum alloy;
(c) casting said molten aluminum alloy into a slab having a thickness in the range of 0.1 to 2 inches;
(d) hot rolling said slab into a sheet product;
(e) solution heat treating said sheet product;
(f) quenching said sheet product;
(g) forming said sheet into a tube having a seam;
(h) welding said seam to provide a seam welded tube having an outer diameter and having end regions;
(i) placing said seam welded tube in a forming die;
(j) hydroforming said seam welded tube to form said automotive aluminum drive shaft tube member; and
(k) aging said aluminum drive shaft tube member to increase strength properties.

2. In the production of an aluminum drive shaft in accordance with claim 1 wherein silicon is maintained in the range of 0.4 to 0.6 wt. %.

3. In the production of an aluminum drive shaft in accordance with claim 1 wherein magnesium is maintained in the range of 0.7 to 1.1 wt. %.

4. In the production of an aluminum drive shaft in accordance with claim 1 wherein iron is maintained in the range of 0.1 to 0.5 wt. %.

5. In the production of an aluminum drive shaft in accordance with claim 1 wherein said continuous caster is a belt caster.

6. In the production of an aluminum drive shaft in accordance with claim 1 including solution heat treating said sheet product in a temperature range of 800° to 1000° F.

7. In the production of an aluminum drive shaft in accordance with claim 1 including solution heat treating said sheet product in a temperature range of 850° to 1000° F.

8. In the production of an aluminum drive shaft in accordance with claim 7 including solution heat treating for about 0.5 minutes to 2 hours.

9. In the production of an aluminum drive shaft in accordance with claim 1 including continuously solution heat treating said sheet product after hot rolling.

10. In the production of an aluminum drive shaft in accordance with claim 9 including forced cooling said hot rolled sheet product after said solution heat treating.

11. In the production of an aluminum drive shaft in accordance with claim 1 including hot rolling said slab to a hot rolled sheet product followed by cold rolling.

12. In the production of an aluminum drive shaft in accordance with claim 11 wherein said cold rolling provides a 25 to 60% gauge reduction.

13. In the production of an aluminum drive shaft in accordance with claim 11 including solution heat treating and quenching said cold rolled sheet product.

14. In the production of an aluminum drive shaft in accordance with claim 13 wherein said cold rolled sheet product is solution heat treated in a temperature range of 800° to 1000° F.

15. In the production of an aluminum drive shaft in accordance with claim 1 wherein after hydroforming said aluminum drive shaft tube member has a wall thickness thinner between end regions and thicker at an end region.

16. In the production of an aluminum drive shaft in accordance with claim 1 wherein said hydroforming increases the outer diameter of the welded tube between the end regions and decreases wall thickness to produce a relatively long tube section of increased diameter and thinner wall thickness than at the end regions.

17. In the production of an aluminum automotive drive shaft from a heat treatable aluminum alloy using a continuous caster to cast the alloy into a slab wherein in said production an aluminum drive shaft tube member is joined to end members to form the drive shaft, the aluminum drive shaft tube member made by the method comprising:
(a) providing a molten aluminum alloy consisting essentially of 0.2 to 0.8 wt. % Si, 0.05 to 0.4 wt. % Cu, 0.45 to 1.2 wt. % Mg, 0.04 to 0.35 wt. % Cr, 0.7 wt. % max. Fe, 0.15 wt. % max. Mn, 0.25 wt. % max. Zn, 0.15 wt. % max. Ti, the remainder aluminum, incidental elements and impurities;
(b) providing a continuous caster for continuously casting said molten aluminum alloy;
(c) casting said molten aluminum alloy into a slab having a thickness in the range of 0.1 to 2 inches;
(d) hot rolling said slab into a sheet product;
(e) solution heat treating said sheet product;
(f) quenching said sheet product;
(g) forming said sheet into a tube having a seam;
(h) welding said seam to provide a seam welded tube having an outer diameter and having end regions;
(i) decreasing end regions of the outer diameter of the welded tube to provide a relatively short section of reduced diameter at both ends having an increase in wall thickness; and
(j) aging said aluminum drive shaft tube member to increase strength properties.

18. In the production of an aluminum drive shaft in accordance with claim 17 including decreasing said outer diameter using swaging or reducing die.

19. In the production of an aluminum automotive drive shaft from a heat treatable aluminum alloy using a continuous caster to cast the alloy into a slab wherein in said production an aluminum drive shaft tube member is joined to end members to form the drive shaft, the aluminum drive shaft tube member made by the method comprising:
(a) providing a molten aluminum alloy consisting essentially of 0.2 to 0.8 wt. % Si, 0.05 to 0.4 wt. % Cu, 0.45 to 1.2 wt. % Mg, 0.04 to 0.35 wt. % Cr, 0.7 wt. % max. Fe, 0.15 wt. % max. Mn, 0.25 wt. % max. Zn, 0.15 wt. % max. Ti, the remainder aluminum, incidental elements and impurities;
(b) providing a belt caster for continuously casting said molten aluminum alloy;
(c) casting said molten aluminum alloy into a slab having a thickness in the range of 0.4 inch to 1.75 inch;
(d) hot rolling said slab into a hot rolled sheet product, said hot rolling starting in a temperature range of 750° to 1000° F. and ending in a temperature of 425° to 950° F.;
(e) solution heat treating, quenching and aging said hot rolled sheet product to a T4 condition, said hot rolled sheet product having a tensile strength in the range of 20 to 35 KSI, a minimum yield strength of 9 KSI, and an elongation of greater than 15%;
(f) forming said sheet into a tube having a seam;
(g) welding said seam to provide a seam welded tube;
(h) placing said seam welded tube in a forming die;
(i) hydroforming said seam welded tube to form said automotive aluminum drive shaft tube member; and
(j) aging said aluminum drive shaft tube member to increase strength properties.

20. In the production of an aluminum drive shaft in accordance with claim 19 wherein magnesium is maintained in the range of 0.7 to 1.1 wt. %.

21. In the production of an aluminum drive shaft in accordance with claim 19 wherein iron is maintained in the range of 0.1 to 0.5 wt. %.

22. In the production of an aluminum drive shaft in accordance with claim 19 including solution heat treating said hot rolled sheet in a temperature range of 800° to 1000° F.

23. In the production of an aluminum drive shaft in accordance with claim 19 including solution heat treating said hot rolled sheet in a temperature range of 850° to 1000° F.

24. In the production of an aluminum drive shaft in accordance with claim 22 including solution heat treating for about 0.5 minutes to 3 hours.

25. In the production of an aluminum drive shaft in accordance with claim 19 including continuously solution heat treating said sheet product.

26. In the production of an aluminum drive shaft in accordance with claim 19 including cold rolling said hot rolled sheet product.

27. In the production of an aluminum drive shaft in accordance with claim 26 wherein said cold rolling provides a 25 to 60% gauge reduction.

28. In the production of an aluminum drive shaft in accordance with claim 26 including solution heat treating and quenching said cold rolled sheet product.

29. In the production of an aluminum drive shaft in accordance with claim 19 wherein after hydroforming said aluminum drive shaft tube member has a wall thickness thinner between end regions and thicker at an end region.

30. In the production of an aluminum drive shaft in accordance with claim 19 wherein said hydroforming increases the outer diameter of the welded tube between the end regions and decreases wall thickness to produce a relatively long tube section of increased diameter and thinner wall thickness than the end regions.

31. In the production of an aluminum automotive drive shaft from a heat treatable aluminum alloy using a continuous caster to cast the alloy into a slab wherein in said production an aluminum drive shaft tube member is joined to end members to form the drive shaft, the aluminum drive shaft tube member made by the method comprising:
(a) providing a molten aluminum alloy consisting essentially of 0.2 to 0.8 wt. % Si, 0.05 to 0.4 wt. % Cu, 0.45 to 1.2 wt. % Mg, 0.04 to 0.35 wt. % Cr, 0.7 wt. % max. Fe, 0.15 wt. % max. Mn, 0.25 wt. % max. Zn, 0.15 wt. % max. Ti, the remainder aluminum, incidental elements and impurities;
(b) providing a belt caster for continuously casting said molten aluminum alloy;
(c) casting said molten aluminum alloy into a slab having a thickness in the range of 0.4 inch to 1.75 inch;
(d) hot rolling said slab into a hot rolled sheet product, said hot rolling starting in a temperature range of 750° to 1000° F. and ending in a temperature of 425° to 950° F.;
(e) solution heat treating, quenching and aging said hot rolled sheet product to a T4 condition, said hot rolled sheet product having a tensile strength in the range of 20 to 35 KSI, a minimum yield strength of 9 KSI, and an elongation greater than 15%;
(f) forming said sheet into a tube having a seam;
(g) welding said seam to provide a seam welded tube;
(h) decreasing end regions of the outer diameter of the welded tube to provide a relatively short section of reduced diameter at both ends having an increase in wall thickness; and
(i) aging said aluminum drive shaft tube member to increase strength properties.

32. In the production of an aluminum drive shaft in accordance with claim 31 including decreasing said outer diameter using swaging or reducing die.

33. In the production of an aluminum automotive drive shaft from a heat treatable aluminum alloy using a continuous caster to cast the alloy into a slab wherein in said production an aluminum drive shaft tube member is joined to end members to form the drive shaft, the aluminum drive shaft tube member made by the method comprising:
(a) providing a molten aluminum alloy consisting essentially of 0.2 to 0.8 wt. % Si, 0.05 to 0.4 wt. % Cu, 0.45 to 1.2 wt. % Mg, 0.04 to 0.35 wt. % Cr, 0.7 wt. % max. Fe, 0.15 wt. % max. Mn, 0.25 wt. % max. Zn, 0.15 wt. % max. Ti, the remainder aluminum, incidental elements and impurities;
(b) providing a belt caster for continuously casting said molten aluminum alloy;
(c) casting said molten aluminum alloy into a slab having a thickness of 0.4 to 1.75 inches;
(d) hot rolling said slab into a hot rolled sheet product;
(e) cold rolling said hot rolled sheet product to a thickness in the range of 0.06 inch to 0.2 inch to provide a cold rolled sheet product;
(f) solution heat treating, quenching and aging said cold rolled sheet product to provide a solution heat treated sheet product, said solution heat treated sheet product having a tensile yield strength in the range of 20 to 35 KSI, a minimum yield strength of 9 KSI, and an elongation of greater than 15%;
(g) forming said solution heat treated, quenched and aged sheet product into a tube having a seam;
(h) welding said seam to provide a seam welded tube having an outer diameter and having end regions;
(i) placing said seam welded tube in a forming die;
(j) hydroforming said seam welded tube to form said automotive aluminum drive shaft tube member; and
(k) aging said aluminum drive shaft tube member to increase strength properties.

34. In the production of an aluminum drive shaft in accordance with claim 33 wherein after hydroforming said aluminum drive shaft tube member has a wall thickness thinner between end regions and thicker at an end region.

35. In the production of an aluminum drive shaft in accordance with claim 33 wherein said hydroforming increases the outer diameter of the welded tube between the end regions and decreases wall thickness to produce a relatively long tube section of increased diameter and thinner wall thickness than at the end regions.

36. In the production of an aluminum drive shaft in accordance with claim 33 including solution heat treating, quenching and aging said cold rolled product to a T4-temper.

37. In the production of an aluminum drive shaft in accordance with claim 33 including homogenizing said slab prior to hot rolling.

38. In the production of an aluminum drive shaft in accordance with claim 37 including homogenizing in a temperature range of 900° to 1100° F.

39. In the production of an aluminum drive shaft in accordance with claim 38 including homogenizing for about 2 to 12 hours.

40. In the production of an aluminum drive shaft in accordance with claim 37 including homogenizing in a temperature range of 950° to 1075° F.

41. In the production of an aluminum drive shaft in accordance with claim 33 including continuously solution heat treating said cold rolled sheet product.

42. In the production of an aluminum drive shaft in accordance with claim 33 wherein said cold rolling provides a 25 to 60% gauge reduction.

43. In the production of an aluminum automotive drive shaft from a heat treatable aluminum alloy using a continuous caster to cast the alloy into a slab wherein in said production an aluminum drive shaft tube member is joined to end members to form the drive shaft, the aluminum drive shaft tube member made by the method comprising:
- (a) providing a molten aluminum alloy consisting essentially of 0.2 to 0.8 wt. % Si, 0.05 to 0.4 wt. % Cu, 0.45 to 1.2 wt. % Mg, 0.04 to 0.35 wt. % Cr, 0.7 wt. % max. Fe, 0.15 wt. % max. Mn, 0.25 wt. % max. Zn, 0.15 wt. % max. Ti, the remainder aluminum, incidental elements and impurities;
- (b) providing a belt caster for continuously casting said molten aluminum alloy;
- (c) casting said molten aluminum alloy into a slab having a thickness of 0.4 to 1.75 inches;
- (d) hot rolling said slab into a hot rolled sheet product;
- (e) cold rolling said hot rolled sheet product to a thickness in the range of 0.06 inch to 0.2 inch to provide a cold rolled sheet product;
- (f) solution heat treating, quenching and aging said cold rolled sheet product to provide a solution heat treated sheet product, said solution heat treated sheet product having a tensile strength in the range of 20 to 35 KSI, a minimum yield strength of 9 KSI, and an elongation of greater than 15%;
- (g) forming said solution heat treated, quenched and aged sheet product into a tube having a seam;
- (h) welding said seam to provide a seam welded tube having an outer diameter and having end regions;
- (i) decreasing end regions of the outer diameter of the welded tube to provide a relatively short section of reduced diameter at both ends having an increase in wall thickness; and
- (j) aging said aluminum drive shaft tube member to increase strength properties.

44. In the production of an aluminum drive shaft in accordance with claim 43 including decreasing said outer diameter using swaging or reducing die.

45. A method for producing aluminum automotive drive shaft from a heat treatable aluminum alloy using a continuous caster to cast the alloy into a slab wherein in said production an aluminum drive shaft tube member is joined to end members to form the drive shaft, the aluminum drive shaft tube member made by the method comprising:
- (a) providing a molten aluminum alloy consisting essentially of 0.2 to 0.8 wt. % Si, 0.05 to 0.4 wt. % Cu, 0.45 to 1.2 wt. % Mg, 0.04 to 0.35 wt. % Cr, 0.7 wt. % max. Fe, 0.15 wt. % max. Mn, 0.25 wt. % max. Zn, 0.15 wt. % max. Ti, the remainder aluminum, incidental elements and impurities;
- (b) providing a belt caster for continuously casting said molten aluminum alloy;
- (c) casting said molten aluminum alloy into a slab having a thickness of 0.4 to 1.75 inches;
- (d) hot rolling said slab into a hot rolled sheet product, said hot rolling starting in a temperature range of 750° F. to 1000° F. and ending in a temperature range of 425° to 950° F.;
- (e) homogenizing said hot rolled sheet product to provide an solution heat treated sheet product;
- (f) cold rolling said homogenized sheet product to a thickness in the range of 0.06 inch to 0.2 inch to provide a cold rolled sheet product;
- (g) solution heat treating and quenching said cold rolled sheet product to provide a solution heat treated and quenched sheet product;
- (h) forming said solution heat treated and quenched sheet product into a tube having a seam;
- (i) welding said seam to provide a seam welded tube having an outside diameter and having end regions;
- (j) placing said seam welded tube in a forming die;
- (k) hydroforming said seam welded tube to form said automotive aluminum drive shaft tube member; and
- (l) aging said aluminum drive shaft tube member to increase strength properties.

46. The method in accordance with claim 45 wherein homogenizing is carried out in a temperature range of 900° to 1100° F.

47. The method in accordance with claim 45 wherein said cold rolled sheet product has a thickness in the range of 0.06 inch to 0.2 inch.

48. In the production of an aluminum automotive drive shaft from a heat treatable aluminum alloy using a continuous caster to cast the alloy into a slab wherein in said production an aluminum drive shaft tube member is joined to end members to form the drive shaft, the aluminum drive shaft tube member made by the method comprising:
- (a) providing a molten aluminum alloy consisting essentially of 0.2 to 0.8 wt. % Si, 0.05 to 0.4 wt. % Cu, 0.45 to 1.2 wt. % Mg, 0.04 to 0.35 wt. % Cr, 0.7 wt. % max. Fe, 0.15 wt. % max. Mn, 0.25 wt. % max. Zn, the remainder aluminum, incidental elements and impurities;
- (b) providing a belt caster for continuously casting said molten aluminum alloy;
- (c) casting said molten aluminum alloy into a slab having a thickness in the range of 0.1 to 2 inches;
- (d) hot rolling said slab into a hot rolled sheet product, said hot rolling starting in a temperature range of 750° F. to 1000° F. and ending in a temperature range of 425° to 950° F.;
- (e) subjecting said hot rolled sheet product to a first solution heat treatment to provide a first solution heat treated sheet product;
- (f) cold rolling said first solution heat treated sheet product to a thickness in the range of 0.06 inch to 0.2 inch to provide a cold rolled sheet product;
- (g) subjecting said cold rolled sheet product to a second solution heat treatment and then quenching and aging to a T4 condition to provide an aged sheet product having a tensile strength in the range of 20 to 35 KSI, a minimum yield strength of 9 KSI, and an elongation of greater than 15%;
- (h) forming said aged sheet product into a tube having a seam;
- (i) welding said seam to provide a seam welded tube having outside diameter and having end regions;
- (j) placing said seam welded tube in a forming die;

(k) forming said seam welded tube to form said automotive aluminum drive shaft tube having end regions of relative short length having decreased outside diameter; and (l) aging said aluminum drive shaft tube member to increase strength properties.

49. In the production of an aluminum drive shaft in accordance with claim 48 wherein said forming is achieved using hydroforming, swaging or a reducing die.

50. In the production of an aluminum drive shaft in accordance with claim 48 wherein said first solution heat treatment includes batch solution heat treating said hot rolled sheet product.

51. In the production of an aluminum drive shaft in accordance with claim 48 wherein said first solution heat treatment includes continuous solution heat treating said hot rolled sheet product.

52. In the production of an aluminum drive shaft in accordance with claim 48 including solution heat treating in a temperature range of 800° to 1000° F.

53. In the production of an aluminum drive shaft in accordance with claim 48 including solution heat treating in a temperature range of 850° to 1000° F.

54. In the production of an aluminum drive shaft in accordance with claim 48 wherein said cold rolling provides a 25 to 60% gauge reduction.

55. In the production of an aluminum automotive drive shaft from a heat treatable aluminum alloy using a continuous caster to cast the alloy into a slab wherein in said production an aluminum drive shaft tube member is joined to end members to form the drive shaft, the aluminum drive shaft tube member made by the method comprising:

(a) providing a molten aluminum alloy consisting essentially of 0.2 to 0.8 wt. % Si, 0.05 to 0.4 wt. % Cu, 0.45 to 1.2 wt. % Mg, 0.04 to 0.35 wt. % Cr, 0.7 wt. % max. Fe, 0.15 wt. % max. Mn, 0.25 wt. % max. Zn, 0.15 wt. % max. Ti, the remainder aluminum, incidental elements and impurities;

(b) providing a belt caster for continuously casting said molten aluminum alloy into a slab having a thickness in the range of 0.4 inch to 1.75 inch;

(c) hot rolling said slab into a hot rolled sheet product starting in a temperature range of 750° to 1000° F. and ending in a temperature range of 425° to 950° F.;

(d) continuously annealing said hot rolled sheet product in a temperature range of 750° to 1000° F. to provide a fully recrystallized product;

(e) cold rolling said fully recrystallized product to a cold rolled sheet product having a thickness in the range of 0.06 inch to 0.2 inch;

(f) thereafter, continuously solution heat treating said cold rolled sheet product then quenching and aging to a T4 condition to provide a sheet product in the T4 condition;

(g) forming said sheet in the T4 condition into a tube having seam;

(h) welding said seam to provide a seam welded tube;

(i) placing said seam welded tube in a forming die having an outside diameter and end regions;

(j) hydroforming said seam welded tube to form said automotive aluminum drive shaft tube having a portion thereof between said end regions having increased diameter and thinned wall thickness; and (k) aging said aluminum drive shaft tube member to increase strength properties.

* * * * *